R. SCHWESINGER.
MUD LUG FOR TRACTION WHEELS.
APPLICATION FILED JUNE 20, 1912.
1,066,956.
Patented July 8, 1913.
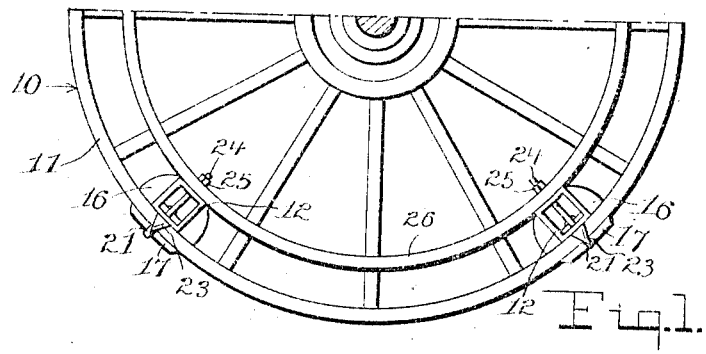
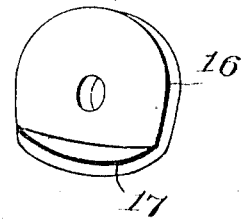
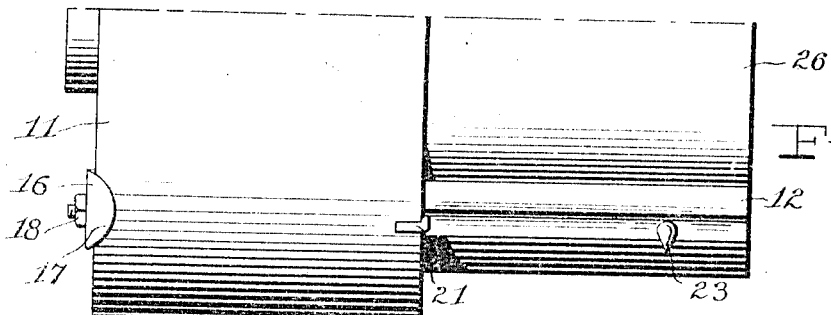
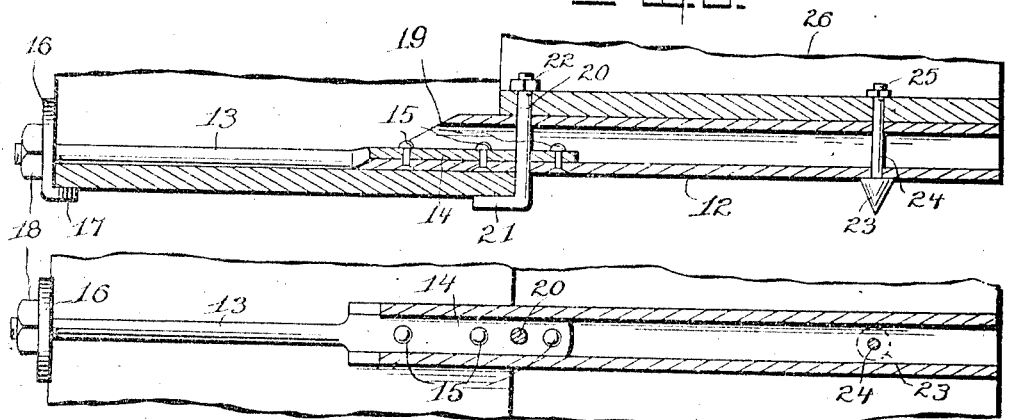
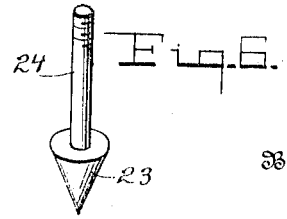
Witnesses
R. N. Jones.
J. Burch.
Inventor
R. Schwesinger.
By Chandler & Chandler
Attorneys

UNITED STATES PATENT OFFICE.

RUDOLPH SCHWESINGER, OF PLENTYWOOD, MONTANA.

MUD-LUG FOR TRACTION-WHEELS.

1,066,956.

Specification of Letters Patent.

Patented July 8, 1913.

Application filed June 20, 1912. Serial No. 704,889.

*To all whom it may concern:*

Be it known that I, RUDOLPH SCHWESINGER, a citizen of the United States, residing at Plentywood, in the county of Valley, State of Montana, have invented certain new and useful Improvements in Mud-Lugs for Traction-Wheels; and I do hereby declare the following to be a full, clear, and exact description of the invention, such as will enable others skilled in the art to which it appertains to make and use the same.

The present invention consists in a new and improved traction wheel and more particularly to a novel and improved anti-slipping device therefor whereby when the wheels become sunken or embedded in the ground surface, especially in soft soil and bog holes, the said element will thus operate to afford proper traction and permit the advancement of the engine or machine.

Specifically the invention resides in a simple and strong mud lug of novel construction and rigidly attached to the rim of a traction wheel inwardly of the periphery thereof and interiorly connected by a rim or tire to brace the same when used.

With the above and other objects in view, this invention resides in the novel features of construction, formations, combinations and arrangements of parts to be hereinafter more fully described, claimed and illustrated in the accompanying drawing, in which:—

Figure 1 is a side elevation of a fragmentary portion of a traction wheel having my improved traction means or extension mud lug secured thereto. Fig. 2 is an end elevation of the device. Fig. 3 is an enlarged transverse sectional view taken through the traction wheel and one of the lugs. Fig. 4 is a horizontal sectional view of the parts illustrated in Fig. 3. Fig. 5 is a detail perspective view of fastening washer employed with one of the lugs. Fig. 6 is a similar view of a supplementary lug attached to one of the extension lugs.

In illustrating the practical application of the invention there is shown a fragmentary portion of a traction wheel indicated by the numeral 10, to the rim portion 11 of which a plurality of spaced laterally extending mud lugs 12 are secured. These lugs are spaced at suitable distances around the periphery of the tire inwardly of which they are secured through the medium of bolts 13 which contact with the inner face of the rim and which have their projected or outer extremities flattened out as shown at 14 and provided with a suitable number of apertures for riveting the same to the outer portion of the lug 12 as illustrated at 15 while the opposite end of the bolt is threaded and extends beyond the opposite edge of the rim where it is secured to the rim through the medium of a washer 16 engaged on the bolt and having an inwardly directed portion or edge 17 forming a hook to engage the peripheral face of the rim and also serve as an anti-slipping means when retained in position by means of a binding nut 18.

As illustrated, the extension lug 12 is shown as composed of a hollow rectangular section of metal but I wish to have it understood that I may employ any other shape as fairly falls within the scope of the present invention as claimed, and the inner end of each lug is beveled as shown at 19 to assist in the proper securing of the bolt 13 thereto without decreasing the usefulness of the lugs. In order to further hold the lugs in position, a bolt 20 is engaged through each lug adjacent its inner portion, in a radial direction with respect to the wheel and has its outer end bent against the periphery of the rim as shown at 21 to form a substantially L-shaped clamping member secured in position by a nut 22 engaged on the threaded end of the bolt and in contact with the inner face of the rim or tire 26. By this means lateral displacement of the lugs is prevented and the bent portions of the washers 16 and the bolts 20 greatly assist in securing proper traction.

The extension lugs 12 are further provided with cone-shaped anti-slipping members or supplementary lugs 23 having threaded stems 24 engaged therethrough near their outer ends and secured by binding nuts 25 while all of the main or primary lugs 12 are connected by the rim or tire 26 which is secured in position by the nuts 22 and 25 respectively so as to brace the lugs in their operation. Thus, it will be evident that if the traction wheel or rim thereof becomes sunken or embedded in the ground, the main and supplementary lugs will engage the ground and prevent further slipping whereby increased traction is provided to cause the advancement of the engine or machine whereas only the rim 11 contacts with the ground surface at other times.

Having thus fully described this invention what I claim as new and desire to protect by Letters Patent, is:—

1. The combination with the rim of a wheel; of extended lugs arranged at spaced distances therearound, each lug embodying a bolt transversely contacting with the rim, means at one end of the bolt for anchoring the same to the rim, an extension carried by the bolt and projecting beyond the rim, clamping members connecting the bolt and extension member to the rim, a supplementary rim also attached thereby to the extension members and rim first mentioned and fastening means independently connecting the supplementary rim and extension members to form antislipping means.

2. The combination with a traction wheel; of an extension rim of lesser diameter than said traction wheel and means for securing said rim to the wheel, said means comprising extension lugs, bolts secured to the extension lugs and engaging transversely of the inner face of the wheel rim portion, securing members engaged through the bolts at one end and the adjacent portions of the lugs and additional securing members engaged on the other ends of the bolts, all of the securing members being provided with rebent portions held in binding contact with the periphery of the wheel.

3. In a mud lug for traction engine wheels, a bolt having a flattened portion, a hollow extension member secured to the bolt at its flattened portion, a washer on the threaded end of the bolt and having a rebent portion to contact with the periphery of a traction wheel, means for retaining said washer in position, an angular clamping member engaged through the lug and flattened portion of the bolt for similarly engaging the wheel, a nut for retaining said angular member in position, a supplementary attaching lug carried by the extension lug having a threaded stem engaged through the extension lug and a nut engaged on said stem.

In testimony whereof, I affix my signature, in presence of two witnesses.

RUDOLPH SCHWESINGER.

Witnesses:
WM. ERICKSON,
C. M. OLUFSON.